(12) United States Patent
Lin et al.

(10) Patent No.: US 9,206,918 B2
(45) Date of Patent: Dec. 8, 2015

(54) METERING VALVE

(71) Applicant: Basso Industry Corp., Taichung (TW)

(72) Inventors: Chang-Sheng Lin, Taichung (TW); Yao-Sheng Shen, Taichung (TW); An-Gi Liu, Taichung (TW)

(73) Assignee: Basso Industry Corp., Taichung (TW)

( * ) Notice: Subject to any disclaimer, the term of this patent is extended or adjusted under 35 U.S.C. 154(b) by 0 days.

(21) Appl. No.: 14/262,821

(22) Filed: Apr. 28, 2014

(65) Prior Publication Data

US 2014/0319400 A1  Oct. 30, 2014

(30) Foreign Application Priority Data

Apr. 29, 2013  (TW) .............................. 102207859 U

(51) Int. Cl.
*F16K 21/04* (2006.01)
*B25C 1/04* (2006.01)

(52) U.S. Cl.
CPC ................ *F16K 21/04* (2013.01); *B25C 1/047* (2013.01)

(58) Field of Classification Search
USPC ............................ 222/402.1–402.25; 251/323
See application file for complete search history.

(56) References Cited

U.S. PATENT DOCUMENTS

| 3,128,924 | A | * | 4/1964 | Gorman ..................... 222/402.2 |
| 3,575,322 | A | * | 4/1971 | Jordon et al. ............... 222/402.2 |
| 6,302,297 | B1 |  | 10/2001 | Richardson et al. |
| 6,419,168 | B1 |  | 7/2002 | Thieleke et al. |
| 2002/0074349 | A1 | * | 6/2002 | Michaels et al. ........... 222/146.3 |
| 2003/0178448 | A1 | * | 9/2003 | Warby et al. ............. 222/402.24 |
| 2003/0230603 | A1 | * | 12/2003 | Smith ......................... 222/402.2 |
| 2004/0084483 | A1 | * | 5/2004 | Martin et al. ............... 222/402.1 |
| 2004/0124217 | A1 | * | 7/2004 | Yquel et al. .............. 222/402.21 |
| 2006/0237487 | A1 | * | 10/2006 | Allsop ........................ 222/402.2 |
| 2008/0135584 | A1 | * | 6/2008 | Wickman .................... 222/402.2 |
| 2011/0101037 | A1 | * | 5/2011 | Ghavami-Nasr et al. .. 222/402.2 |

* cited by examiner

*Primary Examiner* — Donnell Long
(74) *Attorney, Agent, or Firm* — CKC & Partners Co., Ltd.

(57) ABSTRACT

A metering valve includes a valve main body consisting of a body and a cover, a sliding rod and an elastic member. The body has a positioning hole, a metering chamber, a containing space, and two sealing pads disposed on two end portions of the metering chamber. The containing space is for assembling the gas cylinder. A groove is disconnected with the positioning hole, the metering chamber and the containing space. The sliding rod has two ends, wherein a gas channel is formed from one end toward an inner of the sliding rod, the sliding rod has a flange and a through hole, the through hole under the flange is for connecting the gas channel, and the sliding rod blocks a gas from the metering chamber by cooperating with the sealing pads. The elastic member in the groove is connected to the flange and the groove.

10 Claims, 2 Drawing Sheets

METERING VALVE

RELATED APPLICATIONS

This application claims priority to Taiwan Application Serial Number 102207859 filed Apr. 29, 2013, which is herein incorporated by reference.

BACKGROUND

1. Technical Field

The present invention relates to a metering valve. More particularly, the present invention relates to a metering valve applied to a gas powered nail gun which can assemble a gas cylinder.

2. Description of Related Art

Pneumatic nail gun is one indispensable tool for woodworking decoration, for driving nails into woods with the force from the compressed air. The conventional pneumatic nail gun is powered by high pressured air, which is necessarily equipped with an air compressor. The air compressor weights about from tens to hundreds kilograms. An air pipe is required to connect the air compressor with the pneumatic nail gun, but it occupies spaces and thus holds back the doceration.

In this regard, there is another gas powered nail gun powered by igniting gas. Such conventional gas powered nail gun uses gas from the gas cylinder as a fuel, and provides power by ignition and explosion which, can drive a needle in a striker firing action; that is, the gas powered nail gun has advantages of compact size, lightweight and portability, and does not need electricity. However, in the gas powered nail gun, the arrangement of a metering valve is perpendicular to the axial direction of the gas cylinder, such as the metering valve disclosed in U.S. Pat. No. 6,302,297. As such, the assembling direction of the adapter in the conventional gas powered nail gun is perpendicular to the axial direction of the gas cylinder, which is inconvenient for the user have to deliberately align the adapter with the gas cylinder in the installation.

To address the foregoing problem, another metering valve is provided in U.S. Pat. No. 6,419,168, in which the direction of the outlet of the metering valve and the axial direction of the gas cylinder are the same, so that the user needs not align the adapter with the gas cylinder during the installation of the gas cylinder, so as to eliminate the inconvenience. However, in the disclosure of the U.S. patent, the compression spring utilized in the metering valve is disposed under the sliding rod and connected to one end of the sliding rod. In this configuration the sliding rod, the spring and the gas cylinder are connected serially, such that the metering valve would has an excessive length which requires further improvements.

SUMMARY

According to one aspect of the present disclosure, a metering valve for assembling a gas cylinder includes, a valve main body consists of a body and a cover; wherein the body has a positioning hole, a metering chamber and a containing space in order from a top of the body to a bottom of the body, and further has a first sealing pad being annular-shaped and a second sealing pad being annular-shaped disposed on a top portion and a bottom portion of the metering chamber respectively, the containing space is for assembling the gas cylinder, a groove is disposed between the body and the cover, and the groove is disconnected with the positioning hole, the metering chamber and the containing space; a sliding rod, having a closing end adjacent to the body and an opening end opposite to the closing end, wherein a gas channel is formed from the opening end toward an inner of the sliding rod, an outer surface of the sliding rod has a flange and a through hole, the through hole under the flange is for connecting the gas channel, and the outer surface is for blocking a gas from the metering chamber by cooperating with the first sealing pad and the second sealing pad; and an elastic member, wherein a part of the elastic member is contained in the groove and two ends of the elastic member are connected to the flange and the groove respectively, thus the elastic member is aligned with a side of the sliding rod.

DETAILED DESCRIPTION

Figure 1:
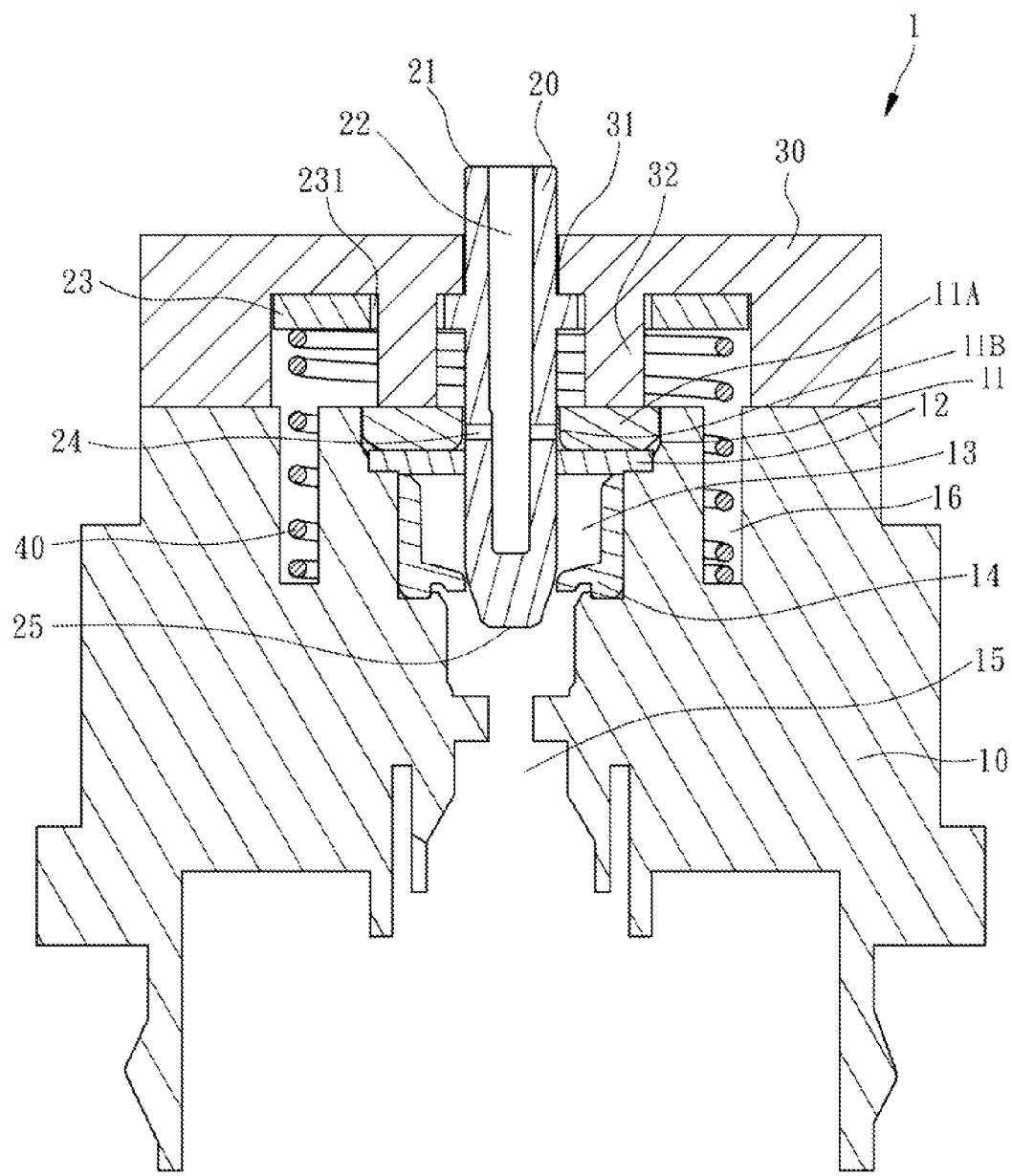
FIG. 1 is a cross-sectional view of one using state of the metering valve according to one example of the present disclosure, wherein the using state displays the sliding rod pressed with electricity.

Reference will now be made in detail to one example illustrated in the accompanying drawings for making a description of the present disclosure, wherein the example is applied to a gas powered nail gun in FIGS. 1 to 2. The example of the present disclosure provides a metering valve 1, which mainly includes: a valve main body consisting of a body 10 and a cover 30, a sliding rod 20 and an elastic member 40, and specific structure and relationship of each element are described in detail as follows:

The body 10 has a positioning hole 11 on the top thereof, a first sealing pad 12, a metering chamber 13, a second sealing pad 14 and a containing space 15 are arranged under the positioning hole 11 in sequence, and the first sealing pad 12 and the second sealing pad 14 are both annular-shaped for letting the positioning hole 11 straightly connecting the containing space 15. A groove 16 with annular-shaped is disposed between the body 10 and the cover 30, the groove 16 is located on a region excluding the location of the positioning hole 11, so that the groove 16 is disconnected with the metering chamber 13 and the containing space 15. According to the example, the volume of the metering chamber 13 is designed according to the gas capacity demanded from the gas powered nail gun, the first sealing pad 12 and a second sealing pad 14 are disposed on a top portion and a bottom portion of the metering chamber 13 respectively for providing required gastight purpose, the containing space 15 is for assembling a gas cylinder and can release the gas in the gas cylinder toward the metering chamber 13. Moreover, a person of ordinary skill in the art can adjust the location of the groove 16 according to the situation, such as arranged on the body 10 or the cover 30, or formed on both the body 10 and the cover 30 (shown in drawings of this example).

The sliding rod 20 has a closing end 25 adjacent to the body and being taper-shaped and an opening end 21 opposite to the closing end 25, a gas channel 22 is formed from the opening end 21 toward an inner of the sliding rod 20 and the upside of the gas channel 22 is connected to a combustion chamber (not shown), and the power for the gas nail gun can be provided by ignition and explosion. An outer surface of the sliding rod 20 has a flange 23 adjacent to the cover 30 and a radial through hole 24 adjacent to the metering chamber 13, that is, the through hole 24 under the flange 23 is for connecting the metering chamber 13 and the gas channel 22. The outer diameter of the sliding rod 20 is basically equal to the diameter of each of the first sealing pad 12 and the seconds sealing pad 14, so that the closing end 25 of the sliding rod 20 is moved toward the containing space 15 through the positioning hole 11, the outer surface of the sliding rod 20 can effectively block the gas in the metering chamber 13 via the first sealing pad 12 and the second sealing pad 14, and exact gas-tight between the second sealing pad 14 and the outer surface of the sliding rod 20 blocks the gas with the containing space 15. According to this example, the sliding rod 20 is passed through an inner side of the elastic member 40, and two ends of the flange 23 are connected to the cover 30 and the elastic member 40 respectively.

The cover 30 is basically U-shaped and caps the body 10 through an opening of the cover 30 and the upside of the flange 23 is fixed to the body 10, a passing hole 31 disposed on the upside of the flange 23 can be passed through by the opening end 21 of the sliding rod 20, the flange 23 of the sliding rod 20 and the elastic member 40 are arranged between the cover 30 and the body 10 in sequence. Moreover, the opening of the cover 30 has at least two posts 32 protruding downwards from an inner side of the opening thereof, at least two opening holes 231 corresponding to the posts 32 are arranged on the flange 23 of the sliding rod 20. According to this example, a positioning pad 11A is detachably disposed on the top of the body, and the positioning hole 11 is corresponded to a center 11B of the positioning pad 11A. Hence, the posts 32 of the cover 30 can abut against the positioning pad 11A passing through the opening hole 231, so that the first sealing pad 12 can be fastened.

In this example, the elastic member is a compression spring, two ends of the compression spring are connected to the flange and the groove respectively. The outer surface of the sliding rod 20 is surround with the compression spring of the body 10, thus the compression spring is aligned with a side of the sliding rod 20, so that the height of the entire metering valve can be decreased effectively.

Figure 2:
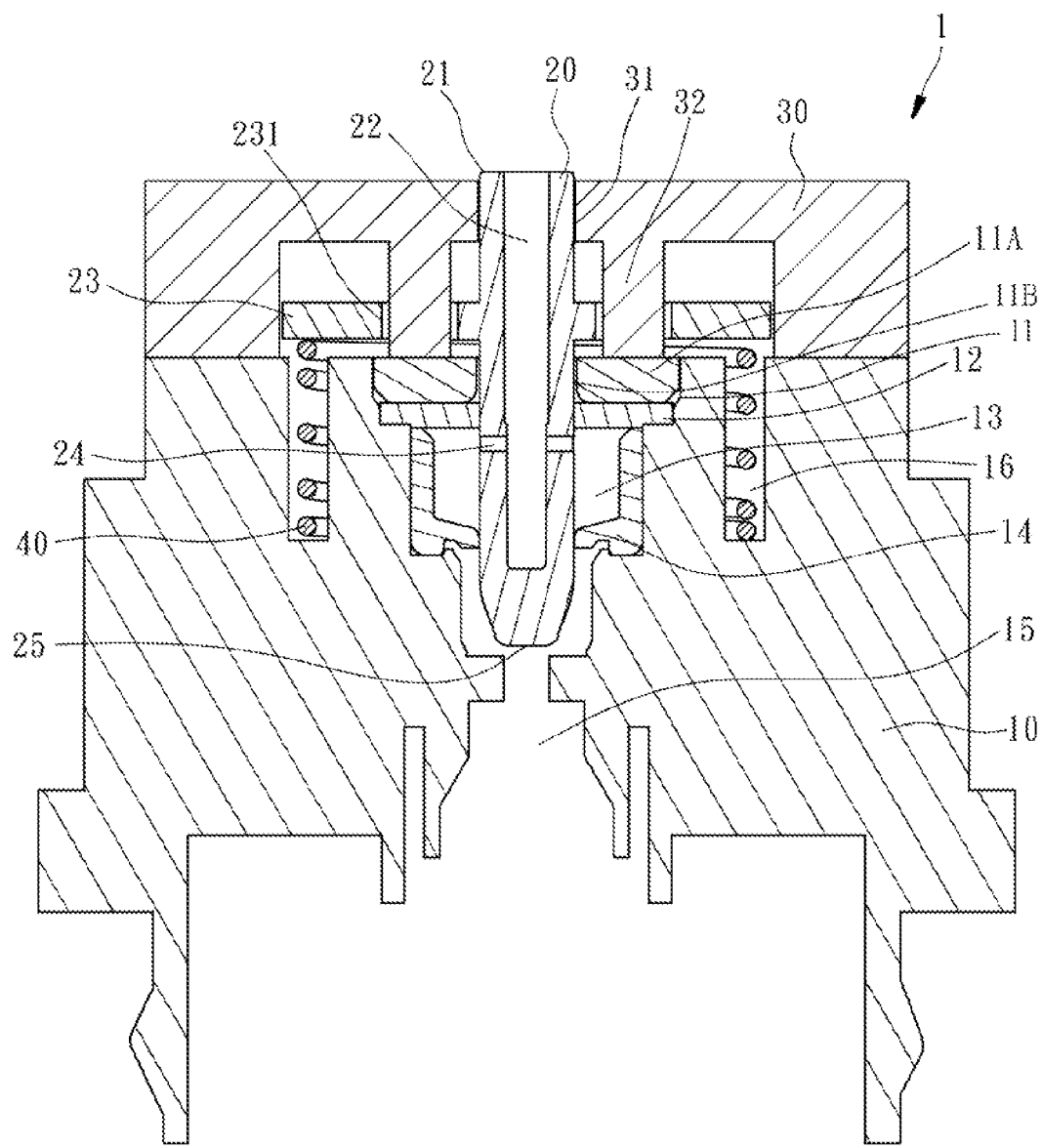
FIG. 2 is a cross-sectional view of another using state of the metering valve of FIG. 1, wherein the using state displays the sliding rod pressed with external force and moved downwards.

In operation, when the gas powered nail gun is not operated, the flange 23 is pushed by an elasticity of the elastic member 40 for pressing against the cover 30, the sliding rod is moved upward at the same time, as shown in FIG. 1, the cover 30 and the elastic member 40 are fastened due to the fixed cover 30 and body 10, in this situation, the gas from the gas cylinder would pass through the interval between the closing end 25 of the sliding rod 20 and the second sealing pad 14, but can be blocked by the outer surface of the sliding rod 20 and the first sealing pad 12, and the through hole 24 is located above the first sealing pad 12, so that the gas from the inner of the metering chamber 13 cannot flow into the gas channel 22, conversely, when the sliding rod 20 is pressed downwards by an external force form the user, the elastic member 40 is pressed by the flange 23 of the sliding rod 20 and moves downwards, the outer surface of the sliding rod 20 can be connected with the second sealing pad 14 first for blocking the gas from the gas cylinder into the metering chamber 13; then, when the through hole 24 is moved beyond the first sealing pad 12 and into the inner of the metering chamber which is moved with the sliding rod 20, as shown in FIG. 2, the gas in the metering chamber can flow through the through hole 24 into the gas channel 22, and then flow into the combustion chamber, so that the power can be provided for the gas powered nail gun.

Furthermore, a person of ordinary skill in the art can change the shape of the groove 16 into another shape, or the compression spring can be replace by another elastic member with compressing elasticity. Also, a plurality of grooves can be arranged on the top of the body 10 and located on a region excluding the location of the positioning hole 11, and corresponded to a plurality of compression springs, the purpose of the present disclosure can be achieved while the flange 23 can be connected to the compression springs.

It will be apparent to those skilled in the art that various modifications and variations can be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A metering valve for assembling a gas cylinder, comprising:
   a valve main body, consisting of a body and a cover, wherein the body has a positioning hole, a metering chamber and a containing space in order from top to bottom of the body, and further has a first sealing pad being annular-shaped and a second sealing pad being annular-shaped disposed on a top portion and a bottom portion of the metering chamber respectively, wherein the containing space is for assembling the gas cylinder, a groove is disposed between the body and the cover, and the groove is disconnected with the positioning hole, the metering chamber and the containing space;
   a sliding rod, having a closing end adjacent to the body and an opening end opposite to the closing end, wherein a gas channel is formed from the opening end toward an inner bottom wall of the sliding rod, an outer surface of the sliding rod has a flange and a through hole, the through hole is under the flange and is connected to the gas channel, and the outer surface is configured for blocking a gas from the metering chamber by cooperating with the first sealing pad and the second sealing pad; and
   an elastic member, wherein a part of the elastic member is contained in the groove and two ends of the elastic member are connected to the flange and the groove respectively, such that the elastic member is aligned with a side of the sliding rod.

2. The metering valve of claim 1, wherein the elastic member is a compression spring.

3. The metering valve of claim 2, wherein the sliding rod is passed through an inner side of the elastic member.

4. The metering valve of claim 1, wherein the groove is annular-shaped.

5. The metering valve of claim 4, wherein the sliding rod is through an inner side of the elastic member.

6. The metering valve of claim 5, wherein the closing end of the sliding rod is taper-shaped.

7. The metering valve of claim 1, wherein the sliding rod is passed through an inner side of the elastic member.

8. The metering valve of claim 1, wherein the cover is basically U-shaped, and is for capping the body.

9. The metering valve of claim 8, wherein a positioning pad is disposed on a top of the body, the positioning hole is corresponded to a center of the positioning pad, the opening of the cover has at least two posts protruding downwards from an inner side of the opening thereof, and at least two opening holes corresponding to the posts are arranged on the flange of the sliding rod, so that the posts are abutted against the positioning pad.

10. The metering valve of claim wherein when the flange is pushed by an elasticity of the elastic member for abutting against the cover, the through hole is located above the first sealing pad, and for blocking the gas from the metering chamber to the gas channel; when the sliding rod is pressed by an external force for pressing the elastic member and moving downwards, the through hole passes through the first sealing pad into the metering chamber, such that the gas from the metering chamber flows through the through hole into the gas channel.

* * * * *